United States Patent [19]

Kronberg

[11] Patent Number: 5,405,231
[45] Date of Patent: Apr. 11, 1995

[54] CONVEYOR WITH ROTARY AIRLOCK APPARATUS

[75] Inventor: James W. Kronberg, Aiken, S.C.

[73] Assignee: The United States of America as represented by the Department of Energy, Washington, D.C.

[21] Appl. No.: 100,161

[22] Filed: Aug. 2, 1993

[51] Int. Cl.$^6$ .............................................. B65G 35/00
[52] U.S. Cl. ..................................... 414/220; 414/219; 414/221; 414/217; 198/950
[58] Field of Search ............... 414/217, 219, 220, 221; 198/950

[56] References Cited

U.S. PATENT DOCUMENTS

| | | | |
|---|---|---|---|
| 2,551,981 | 5/1951 | Thompson | 198/950 X |
| 2,732,086 | 1/1956 | Schnyder | 414/221 X |
| 3,556,355 | 1/1971 | Ruiz | 414/219 X |
| 3,704,772 | 12/1972 | Meier | 414/217 X |
| 4,122,003 | 10/1978 | Hamilton | 198/950 X |
| 4,179,043 | 12/1979 | Fischer | 414/219 X |
| 4,502,827 | 3/1985 | Shows | 414/217 |
| 4,558,982 | 12/1985 | Oakley et al. | 414/220 X |

FOREIGN PATENT DOCUMENTS 713800  2/1980  U.S.S.R. ............................. 414/217

Primary Examiner—Frank E. Werner
Attorney, Agent, or Firm—Brian R. Tumm; Harold M. Dixon; William R. Moser

[57] ABSTRACT

An apparatus for transferring objects from a first region to a second region, the first and second regions having differing atmospheric environments. The apparatus includes a shell having an entrance and an exit, a conveyor belt running through the shell from the entrance to the exit, and a horizontally mounted "revolving door" with at least four vanes revolving about its axis. The inner surface of the shell and the top surface of the conveyor belt act as opposing walls of the "revolving door." The conveyor belt dips as it passes under but against the revolving vanes so as not to interfere with them but to engage at least two of the vanes and define thereby a moving chamber. Preferably, the conveyor belt has ridges or grooves on its surface that engage the edges of the vanes and act to rotate the vane assembly. Conduits are provided that communicate with the interior of the shell and allow the adjustment of the atmosphere of the moving chamber or recovery of constituents of the atmosphere of the first region from the moving chamber before they escape to the second region.

20 Claims, 3 Drawing Sheets

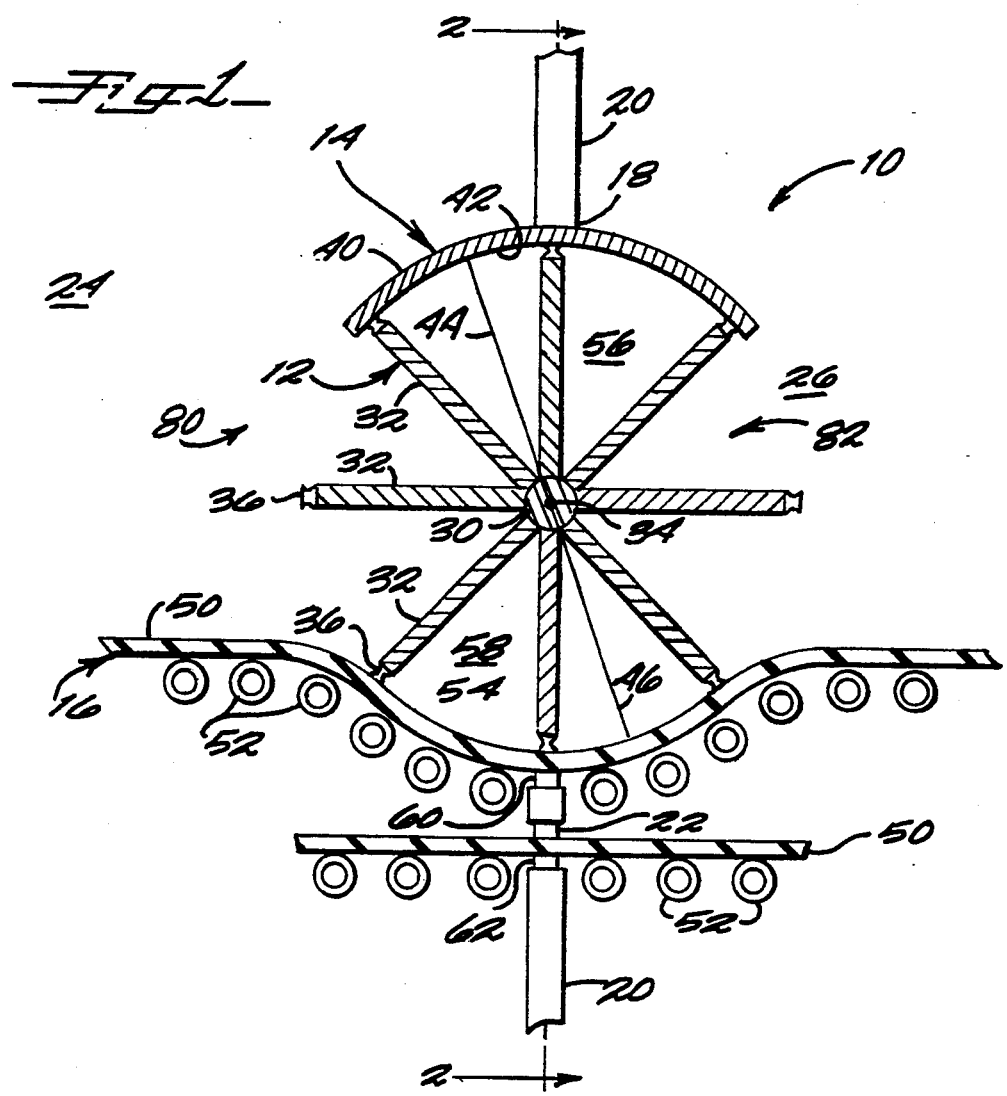
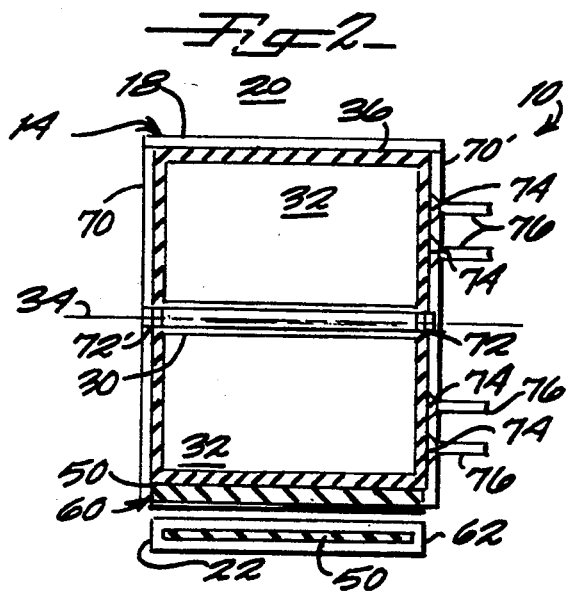
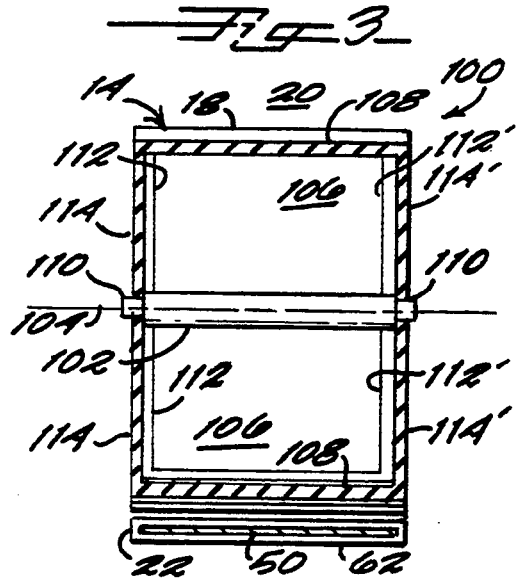

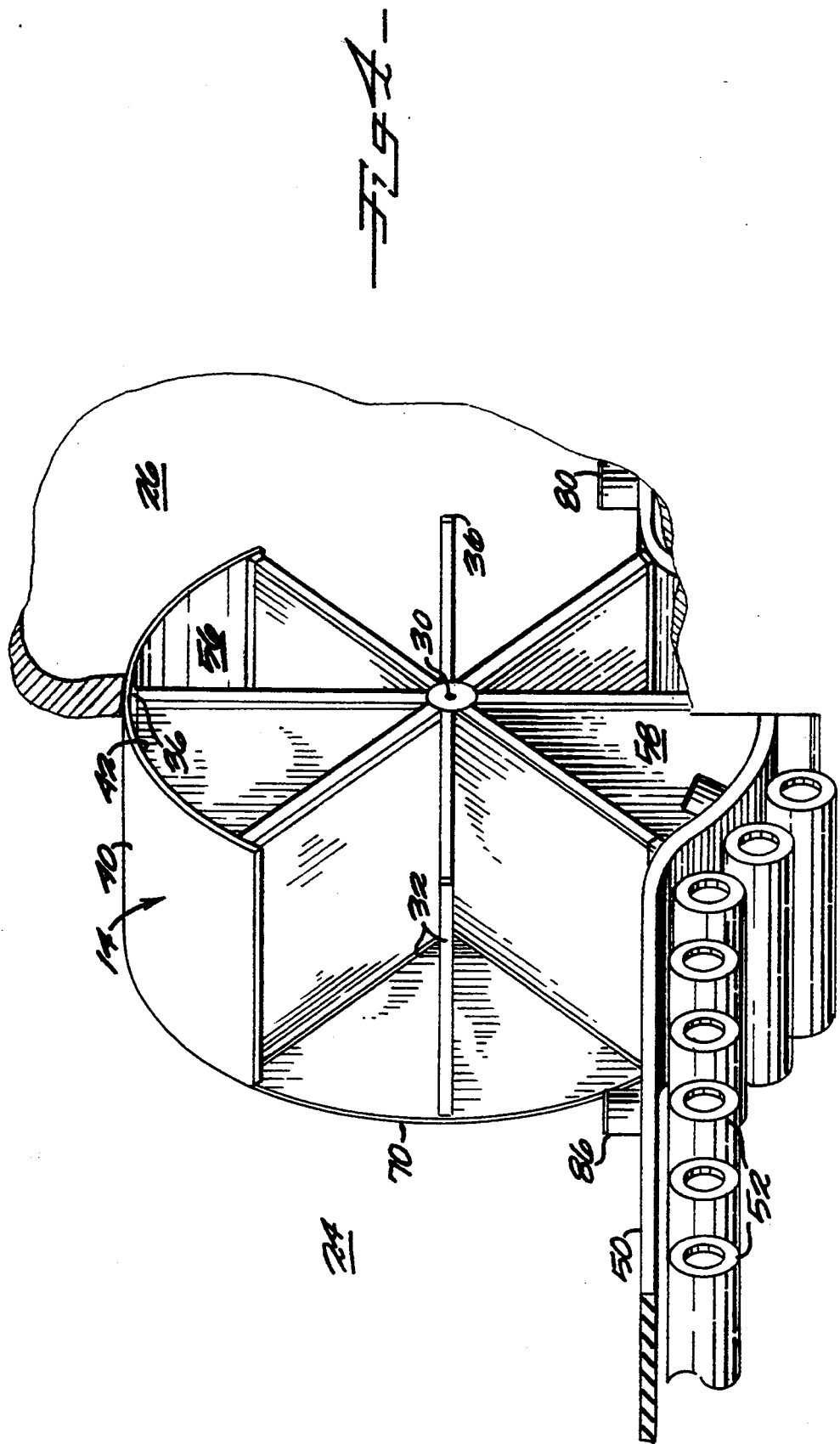

CONVEYOR WITH ROTARY AIRLOCK APPARATUS

BACKGROUND OF THE INVENTION

1. Field of the Invention

The present invention relates to an apparatus for transferring objects from a first region to a second region, the first and second regions having differing atmospheric environments. In particular, the present invention relates to an apparatus that enables movement of a series of objects into and out of a region having a different atmospheric condition while minimizing the escape of the atmosphere of that region. The United States Government has rights in this invention pursuant to Contract No. DE-AC09-89SR18035 between the U.S. Department of Energy and Westinghouse Savannah River Company.

2. Discussion of Background

There are many instances where two regions are separated by a barrier but a passageway is formed in the barrier so that objects or people can pass through. If the atmospheric conditions—temperature, pressure, atmospheric constituents—of one region are different from those of the other, movement of objects or individuals may be controlled to minimize, if not avoid, the blending of the atmospheric conditions of the two zones.

The simplest example of this situation is a door that can be closed after a person enters or leaves a building that is heated or air conditioned. The door may be made more elaborate to assure that the loss of energy associated with heating and air conditioning is minimized: the door may be self closing or may be a revolving door.

A more complex type of passageway is an airlock which is in effect a room between two regions wherein the atmospheric conditions are adjusted to match the region to which the object or person is going from that of the region whence it comes.

The degree of difference between the two regions dictates in part the level of effort required to limit or prevent blending of atmospheres.

In manufacturing and testing, there are processes that require materials and objects to be passed between regions of differing temperatures or pressures, or between regions having atmospheres of different compositions. In some applications, it is sufficient to limit the tree movement of atmosphere between two regions, while in other applications it is important to prevent cross-contamination between the regions. Similar situations are encountered in space and undersea exploration, in air-supported structures such as athletic stadiums, and in the construction industry when temporary air-supported formwork is used.

Many manufacturing processes run continuously, with materials being processed in generally steady streams rather than in discrete batches. Because of the need for repeated cycling, an airlock is inherently a batch device and unsuitable for continuous processes. If airlocks are used in such processes, materials or parts must be collected into batches for passage through the airlock, then dispersed again on its further side. Thus, airlocks are bottlenecks in any otherwise continuous or nearly continuous process.

Moving objects generally, whether between two regions or otherwise, usually entails a conveyor. These might be used in combination with other structures for controlling the movement of material. For example, conveyors with outwardly-projecting flights are used for transporting particulate materials. Abel (U.S. Pat. No. 5,049,007) describes such a conveyor, wherein the free edges of the flights seal against a planar sealing surface located above and parallel to the conveyor belt. In the metering surge bin airlock disclosed by Hamilton (U.S. Pat. No. 4,122,003), the flights are attached to a conveyor belt that extends from a surge bin to a head drum. An arcuate member is disposed about the head drum, such that the inner surface of the member forms a seal with the material carded by the conveyor so that air cannot flow between the material and the member. These devices are not suitable for transporting items between regions of substantially differing atmospheres. Both devices release the transported materials to fall into a container, pneumatic separator or the like. Fragile objects may be damaged by the impact of the fall. Also, it is difficult or impossible to track individual objects passing through such a device.

Rotary devices are also used for transferring objects or particulate materials between two regions. Revolving doors are, of course, well known for controlling the flow of air coming through the door in both directions. A revolving door consists of a curved housing with a vertical axis and openings on opposite sides. Vanes with the axis lying in the same plane radiate from the axis and seal against the inner surfaces of the cylinder as they revolve about that axis. When the vanes are fixed in position, flow stops completely. Magnani (U.S. Pat. No. 4,225,900) provides a safety device that makes possible the normal flow of persons past a fixed revolving door. Douglas (U.S. Pat. No. 4,205,216) provides a laser welding system that includes a housing for a welding station and a revolving door-type turntable for moving workpieces into and out of the housing.

Rotary feeders with generally horizontal axes are also known. In these devices, materials enter the feeder through an inlet and are transported to an outlet by the revolving vanes, as in the devices shown by Fischer (U.S. Pat. No. 4,179,043) and Ruiz (U.S. Pat. No. 3,556,355). Thompson (U.S. Pat. No. 2,551,981) provides a conveyor mechanism with two such rotary feeders, the first receiving material at the inlet and dropping the material onto a conveyor, the second receiving material that is dropped from the conveyor and discharging the material at the outlet.

In all of these rotary devices, materials are transported through a stationary shell by the action of the revolving vanes. Typically, materials fall into the inlet, are moved to the outlet by the vanes, and fall out of the device at the outlet. As in the conveyors described above, materials are scrambled by passage through the device, and fragile objects may be damaged by the impact of the fall.

An apparatus that permits more nearly continuous flow of materials and objects therethrough, while substantially preventing different atmospheres on its opposite sides from mixing or while maintaining a pressure difference between two regions, would be useful in many manufacturing and testing processes. Preferably, the orientation and relative position of materials and objects would be maintained during passage through the apparatus.

SUMMARY OF THE INVENTION

In accordance with its major aspects and broadly stated, the present invention is the combination of a cylindrical shell having an entrance and an exit, a conveyor belt running through the shell from its entrance to its exit, and a vane assembly or horizontally-mounted "revolving door" in the shell. The vane assembly comprises an assembly of four or more vanes revolving about a common axis, each vane extending along that axis and radially from that axis to the shell. The edges of the vanes of the vane assembly, as it rotates, engage the top surface of the conveyor belt, which acts as one side of the "doorway", and the interior surface of the shell, which acts as the other side of the "doorway." In a preferred embodiment, the vane assembly is turned by grooves or ridges on the top surface of the conveyor belt.

The conveyor belt runs horizontally through the first to the second openings of the shell, dipping as it passes under but against the revolving vanes so as not to interfere with them but to engage at least two of them. The vanes engaging the top surface of the conveyor belt and the inside surface of the shell define moving chambers temporarily sealed against the atmospheres of the first and second regions, one chamber isolating each object as it passes from one region to the other. Disks attached to the shell carry conduits into communication with the moving chambers and enable replacement or adjustment of the atmosphere of the chambers as they move. The adjustment may be to assure a transition from the first region to the second or to recover a constituent of the atmosphere of the first region before it reaches the second region. These chambers limit blending of atmospheric conditions or loss of those conditions from the second region to the first.

A major feature of the present invention is the cooperation of the shell, the vane assembly, the conveyor belt and the end disks. By this cooperation, individual objects can be conveyed continually from the first region to the second while loss of the atmospheric characteristics of the second region to the first, or vice versa, is reduced.

An important feature of the present invention is the interaction of the conveyor and the vanes of the vane assembly. Specifically, the conveyor dips to go around but still engage two or more vanes and thereby to seal the moving chambers. Also, the edges of the vanes engage, in the preferred embodiment, ribs or grooves in the conveyor that turn the vane assembly. The ridges or grooves also help to seal the moving chambers and minimize blending of the atmospheres of the two regions. Moreover, by having the conveyor belt rotate the vane assembly, the design of the apparatus is simplified, slippage of the assembly with respect to the belt is avoided, and the physical separation of the objects being conveyed is better maintained.

Another important feature of the present invention is the connections into the chambers formed by the revolving vanes, the end disks, the shell and the conveyor. Connections through the end disks or the shell enable fluid communication with the chambers for adjustment or replacement of the atmospheric characteristics, such as for recovery of constituents of one of the regions before they enter the other region, or adding constituents, or modifying the temperature or pressure. Especially where one region has a hazardous constituent or where a test gas is present in one atmosphere, being able to limit or prevent the loss of the hazardous constituent or test gas is an important advantage of the present apparatus.

Other features and advantages of the present invention will be apparent to those skilled in the art from a careful reading of the Detailed Description of a Preferred Embodiment presented below and accompanied by the drawings.

BRIEF DESCRIPTION OF THE DRAWINGS

In the drawings,

FIG. 1 is a cross-sectional view of an apparatus according to a preferred embodiment of the present invention;

FIG. 2 is a cross-sectional view through the line 2—2 of FIG. 1;

FIG. 3 is a cross-sectional view of an apparatus according to another preferred embodiment of the present invention;

FIG. 4 is a perspective view of the apparatus of FIG. 1;

FIG. 5b is an alternative embodiment of the conveyor belt of FIG. 5a;

FIG. 5c is an alternative embodiment of the conveyor belt of FIG. 5a; and

DETAILED DESCRIPTION OF A PREFERRED EMBODIMENT

Figure 6:
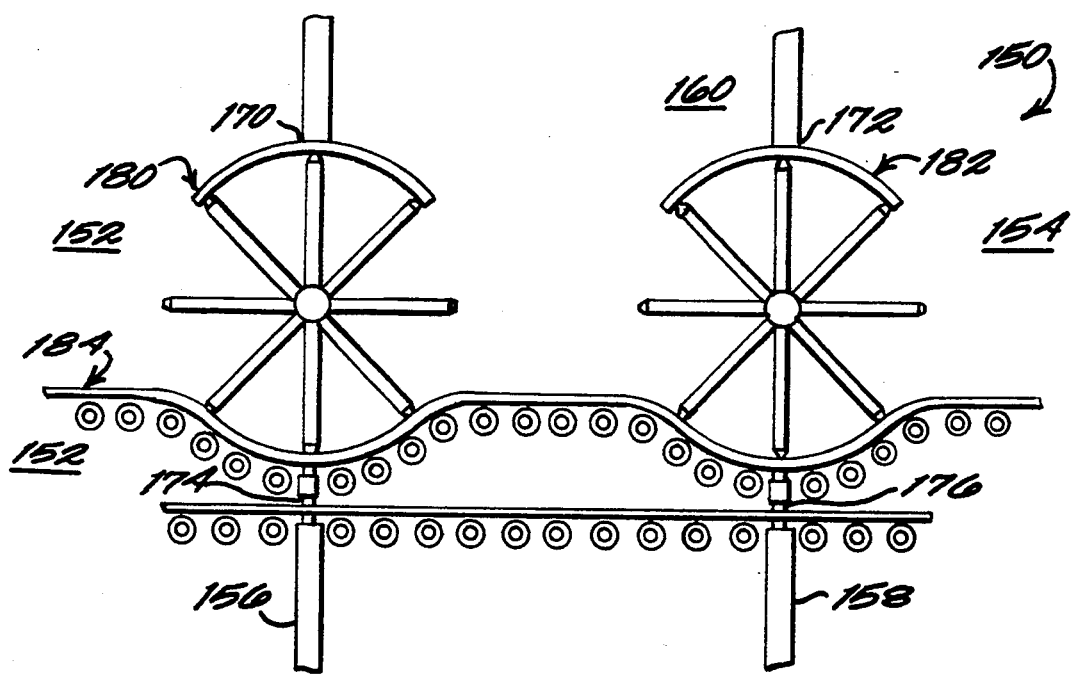
FIG. 6 is a cross-sectional view of a more complex, multistage airlock assembly using the apparatus of FIG. 1.

In the following description, similar components are referred to by the same reference numeral in order to simplify the understanding of the sequential aspect of the drawings.

Referring now to FIG. 1, there is shown a cross-sectional view of an apparatus according to a preferred embodiment of the present invention. An apparatus 10 includes a vane assembly 12, a concave shell 14 and a conveyor assembly 16. Vane assembly 12 is positioned at a first opening 18 in a wall 20. Conveyor assembly 16 runs through opening 18 beneath vane assembly 12, and returns through a second opening 22. Wall 20 forms a barrier between two regions 24 and 26. Regions 24 and 26 may have different ambient conditions, such as different temperatures, pressures, atmospheres and so forth.

Vane assembly 12 has a generally cylindrical shaft or hub 30 carrying at least four vanes 32. Vanes 32 extend axially across shaft 30 so that the outer edges of the vanes reach opening 18. Shaft 30 has an axis 34 that extends across opening 18. Alternatively, shaft 30 may be omitted and vanes 32 joined together at axis 34. The outer edges of vanes 32 carry gaskets 36 of any shape capable of forming substantially gas-tight seals against shell 14 and conveyor assembly 16. Shaft 30, vanes 32 and gaskets 36 are made of materials that are flexible, resilient, durable, and substantially impermeable to gases, such as a rubber or rubberized plastic. Shaft 30 (if present) and vanes 32 may be metal, or some durable ceramic or plastic material that is suitable for use in the operating environment of apparatus 10.

Shell 14 has an outer surface 40 attached to wall 20 at opening 18, and an inner surface 42 that engages gaskets 36 of vane assembly 12. Shell 14 is disposed above vane assembly 12, and positioned so as to engage revolving gaskets 36 so that gaskets 36 form sliding seals against inner surface 42. Therefore, the radius of curvature of shell 14 is approximately equal to the radius of vane assembly 12, indicated in FIG. 1 by radius 44. If desired, inner surface 42 may be coated with a material having a low coefficient of friction, such as TEFLON ®, to facilitate the sliding gaskets 36.

Conveyor assembly 16 is positioned to run beneath vane assembly 12. Conveyor assembly 16 includes a conveyor belt 50, consisting of a flat belt such as are known in the art. Belt 50 may be made of rubber, fabric-reinforced rubber or similar material, further reinforced, if desired, with stiff transverse ribs. Belt 50 is supported by a plurality of rollers 52 and/or by sliding guides (not shown).

As belt 50 passes through first opening 18, it dips to form a concave arc 54 directly beneath and in contact with revolving vanes 32. As with shell 14, the radius of curvature of arc 54 is approximately equal to the radius of vane assembly 12, indicated in FIG. 1 by radius 46. Arc 54 is shaped and positioned so that gaskets 36 form seals against belt 50 as each gasket in turn moves into contact with belt 50. As will now be evident, vane assembly 12 forms a horizontally-mounted "revolving door" in opening 18, with conveyor belt 50 and shell 14 acting as opposing walls of the "doorway."

A first gasket 60 is set in first opening 18 of wall 20. Gasket 60 makes a substantially airtight seal against belt 50 as it moves through opening 18. Since belt 50 is preferably a continuous belt, and thereby forms a closed loop, it must pass through wall 20 twice, to carry objects from region 24 to region 26 (or vice versa) and to return in the opposite direction. If belt 50 is loaded on its return path, a second apparatus such as apparatus 10 will be needed, positioned at second opening 22. If belt 50 is not loaded on its return path, a second gasket 62, set in second opening 22, makes a substantially airtight seal against belt 50 as it moves through the opening.

A cross-sectional view of apparatus 10 through line 2—2 of FIG. 1 is shown in FIG. 2. Vane assembly 12 includes a pair of end disks 70, 70' attached to shell 14 and wall 20, centered on axis 34. Disks 70, 70' have bearings or pivots 72, 72' on which shaft 30 turns. Gaskets 36 of revolving vanes 32 form sliding seals against shell 14, conveyor belt 50, and disks 70, 70'. If desired, one or more holes 74 may be formed through disks 70, 70' or shell 14. Holes 74 connect with conduits 76, leading to equipment (not shown) for adjusting the pressure, temperature and/or composition of the atmosphere in apparatus 10. Conduits 76 can be used in conjunction with the adjustment of atmospheric conditions in the chambers as assembly 10 rotates.

During operation of apparatus 10, vane assembly 12 cooperates with shell 14, conveyor assembly 16 and end disks 70, 70' to limit blending of the atmospheres of regions 24 and 26. As vanes 32 revolve, adjacent vanes 32 temporarily form a moving chamber 56 as the vanes move past shell 14. Chamber 56 is sealed off from regions 24 and 26 as gaskets 36 engage disks 70, 70' and inner surface 42 of shell 14. Similarly, adjacent vanes 32 temporarily form at least one moving chamber 58 as the vanes move in contact with conveyor belt 50. Chamber 58 is sealed off from regions 24 and 26 by adjacent vanes 32, belt 50 and disks 70, 70'. As a result, air cannot pass directly from region 24 to region 26, and any difference in pressure between the regions will not cause vanes 32 to revolve since the forces on both sides of vane assembly 12 are equal. If desired, the pressure, temperature and/or composition of the atmosphere in moving chambers 56 and 58 is adjusted via holes 74 and conduits 76 while the chambers are sealed off from regions 24 and 26.

The circumferential length of shell 14 and arc 54 is sufficiently long that, at any position of vanes 32, at least two opposing vanes form a barrier between regions 24 and 26. Preferably, shell 14 and arc 54 have circumferential lengths at least equal to the width of two chambers 56, and vane assembly 12 has a sufficient number of vanes 32 so that at least one chamber 56 and at least one chamber 58 are sealed off from regions 24 and 26 at any rotary position of the vanes.

If desired, an apparatus such as apparatus 10 can be used to control the atmosphere in chambers 56 and 58 as vanes 32 revolve between region 24 and region 26. By way of example, if apparatus 10 represents a revolving door positioned between two regions 24 and 26 of different temperatures, shell 14 and arc 54 cooperate to form a generally cylindrical chamber with a first opening 80 and a second opening 82 (FIG. 1). A quantity of the atmosphere in region 24 is swept into vane assembly 12 as vanes 32 revolve through the region, and transferred to region 26. Similarly, a quantity of the atmosphere in region 26 is transferred to region 24 by the action of moving vanes 32.

To prevent transfer of gas between regions 24 and 26 and help maintain the atmospheric conditions in the two regions, the pressure, temperature or composition of the atmospheres in moving chambers 56 and 58 may be adjusted via holes 74 and conduits 76. The pressure may be adjusted by adding or withdrawing air (or some other gas), the temperature by adding heated or cooled air, and the composition by adding or withdrawing constituents of interest. For example, conduits 76 may be used to supply cooled or heated air to chamber 56 and/or chamber 58. Alternatively, conduits 76 may recover a portion of cooled (or heated) air from chamber 56 or chamber 58 as vanes 32 sweep air from region 24 to region 26 (or vice versa).

A cross-sectional view of another preferred embodiment of a vane assembly according to the present invention is shown in FIG. 3. A vane assembly 100 has a shaft 102 having an axis 104 and carrying at least four radial vanes 106. Alternatively, shaft 102 is omitted and vanes 106 meet at axis 104. The outer edges of vanes 106 carry gaskets 108. Shaft 102 revolves on a pair of bearings 110, 110'. A pair of end disks 112, 112' is attached to shaft 102 and vanes 106, one disk at each end of shaft 102.

Gaskets or seals 114, 114' are attached to wall 20, positioned in first opening 18 so that disks 112, 112' slide against gaskets 114, 114' to seal opening 18 as vane assembly 100 revolves. Vane assembly 100 is similar to vane assembly 12 as illustrated in FIGS. 1 and 2, except that disks 112, 112' are made parts of the assembly rather than being attached to wall 20 as are disks 70, 70' of vane assembly 12.

In operation, revolving vanes 32 of vane assembly 12 (or vanes 106 of vane assembly 100) engage shell 14 and conveyor belt 50 to seal off region 24 from region 26, as best seen in FIG. 4. Belt 50 carries a series of objects 86, each object in turn transferred into a moving chamber 58 formed by belt 50, end disks 70, 70' and two adjacent vanes 32. Objects 86 are transported through apparatus 10 by moving belt 50, emerging from apparatus 10 in the same order they had on entering the apparatus.

Apparatus 10 operates continuously, so materials and objects carried by belt 50 are moved continually through the apparatus rather than in discrete batches as in a conventional airlock. Therefore, the apparatus is suited for use in conjunction with continuous manufacturing or testing processes. Objects 86 leave apparatus 10 in the same order in which they enter the apparatus, so identification based on their relative position on moving belt 50 is possible.

The speed of conveyor belt 50 is adjusted to match the process rate. However, chambers 56 may contain more than one object, depending on the dimensions of apparatus 10, the size of the objects to be moved between regions 24 and 26, and the nature of the process.

If desired, a plurality of transverse ridges may be formed on the surface of conveyor belt 50, or strips of a suitable sealing material may be attached to the belt in order to mark out the areas of contact with gaskets 36. To ensure that vanes 32 of vane assembly 12 engage belt 50, end disks 70, 70' of vane assembly 12 may engage belt 50, such as through a chain-and-sprocket arrangement or other means known in the art. End disks 112, 112' of vane assembly 100 may engage belt 50 in a similar fashion.

The direction of motion of vane assemblies 12 and 100 is such that, when the vanes engage belt 50, the vanes move with belt 50. Turning now to FIG. 1, if vane assembly 10 (or vane assembly 100) revolves in a clockwise direction, conveyor belt 50 moves counterclockwise. If assembly 10 (or assembly 100) moves counterclockwise, belt 50 moves clockwise. Preferably, the outer edges of vanes 32 and vanes 106 move at approximately the same speed as belt 50. Therefore, the outer edges of vanes 32 and 106 are approximately stationary with respect to belt 50 while in contact with the belt.

Figure 5A:
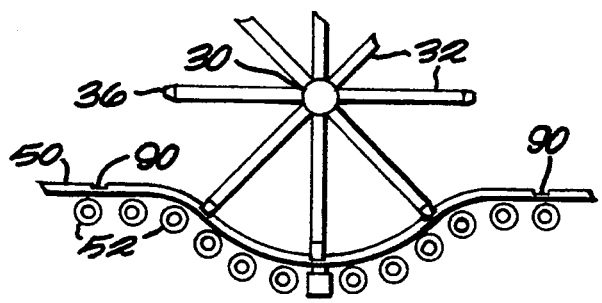
FIG. 5a is a detail view of the apparatus of FIG. 1, showing a conveyor belt according to the present invention.

Vane assembly 12 and conveyor assembly 16 may be driven by the same power source or separate power sources (not shown), or one of the assemblies may drive the other. By way of example, belt 50 may have a series of transverse depressions 90 formed therein, dimensioned to receive gaskets 36 of vanes 32 (FIG. 5a). The revolving vanes releasably engage depressions 90, moving belt 50 in the direction of movement of vanes 32. Alternatively, depressions 90 engage gaskets 36 as belt 50 moves beneath vanes 32, turning the vanes in the direction of movement of the belt.

Figure 5B:
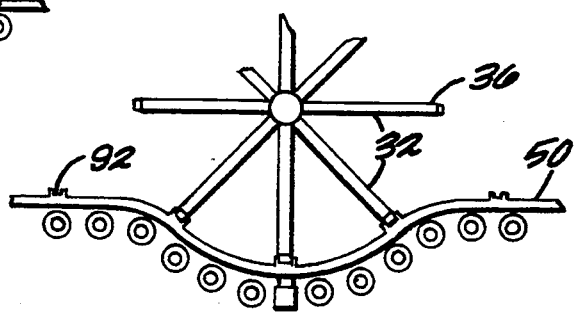
Figure 5C:
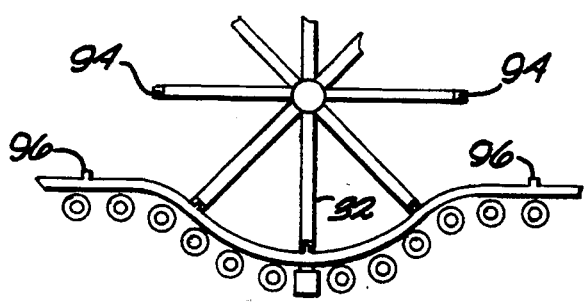

Other surface configurations may facilitate cooperation between vanes 32 and conveyor belt 50. For example, belt 50 may carry a series of transverse ridges 92 dimensioned to receive gaskets 36 (FIG. 5b). Alternatively, depressions 94 formed in gaskets 36 are shaped and dimensioned to engage corresponding ridges 94 of belt 50 (FIG. 5c). These and similar arrangements may be provided for vane assembly 100 if desired.

An apparatus according to the present invention can be used alone, or in arrangements of two or more such apparatus. As shown in FIG. 6, an apparatus 150 may be provided when moving objects between regions where cross-contamination is undesirable. Apparatus 150 is used to convey objects between regions 152 and 154, separated by two walls 156 and 158. Region 160, between walls 156 and 158, may represent a transition area with an atmosphere intermediate between the atmospheres of regions 152 and 154. Alternatively, region 160 might be evacuated, or have a cross-flow of an inert gas to provide a continuous purge to prevent cross-contamination between regions 152 and 154.

Walls 156 and 158 have first openings 170 and 172, and second openings 174 and 176, respectively, formed therein. A pair of apparatus 180 and 182 are positioned in first openings 170 and 172. A conveyor belt assembly 184 runs through first openings 170 and 172, returning through second openings 174 and 176, generally as shown in FIG. 6. Apparatus 180 and apparatus 182 are similar to apparatus 10, with vane assemblies such as vane assembly 12 or vane 100 described above.

Apparatus 180 and apparatus 182 are separated by region 160. Therefore, the transition between regions 152 and 154 may be controlled by providing an intermediate atmosphere in region 160. Region 160 may, for example, be purged continuously with an inert gas to prevent cross-contamination between regions 152 and 154, evacuated, or otherwise held at the desired transfer conditions.

An apparatus according to the present invention is continuously-operating rather than batch-operating: objects are passed continuously or nearly continuously through apparatus 10 rather than in discrete batches. Therefore, the apparatus is suited for use in conjunction with continuous manufacturing or testing processes, including but not limited to the method for leak-testing packages described in commonly assigned patent application Ser. No. 08/070,196, (Detecting Small Holes in Packages, Case No. 78,199), filed Jun. 2, 1993, the disclosure of which is incorporated herein by reference. A package may be tested by placing a minute quantity of a tracer gas such as sulfur hexafluoride ($SF_6$) in the package before closing. The concentration of the gas in the atmosphere outside the closed package is measured and compared to a predetermined value. A measured concentration of $SF_6$ below the predetermined value indicates that the package is intact, i.e., hole-free. A concentration greater than the predetermined value indicates the presence of a hole in the package.

Packages are preferably tested continuously as they are produced. To promote leakage through a hole or holes (if present), the packages may be conveyed into a low-pressure chamber where the air is monitored for the presence of $SF_6$. Those packages that fail the test are diverted off-line and tested individually, and their contents repackaged or discarded. The balance of the packages are distributed as usual.

An airlock may be used to prevent gas flow from the test chamber. However, as noted above, objects pass through a conventional airlock in discrete batches limited by the size of the airlock. Therefore, a conventional airlock is not suited for testing packages in a continuous production process where the packages move in a steady stream rather than in discrete batches.

An apparatus such as apparatus 150 may be used in the practice of the invention. Then, region 160 represents a test chamber having a pressure lower than outside the test chamber. Objects leave region 160 in the same order in which they enter the region. This is important for identifying a package found to leak. Samples are gathered before the items under test leave region 160; removal of defective packages from the conveyor is best done after they emerge from region 160. For positive identification and removal of defective packages, the packages must have the same relative positions after exiting region 160 as while inside region 160. Of known airlock designs, an apparatus according to the present invention is the only one suitable for this application.

Many other manufacturing and testing processes require objects to be passed between areas of higher and lower atmospheric pressures, or between areas having atmospheres of different compositions. Such situations are found in the food, semiconductor, metal-finishing, ceramics and plastics industries. Similar situations are encountered in space and undersea exploration, in air-supported structures such as athletic stadiums, and in the construction industry when temporary air-supported formwork is used. Many processes run continuously, so conventional airlocks, if used, can form bottlenecks in any process using them. An airlock according to the present invention, on the other hand, permits continual flow of objects while substantially preventing different atmospheres on its opposite sides from mixing.

It will be apparent to those skilled in the art that many changes and substitutions can be made to the preferred embodiment herein described without departing from the spirit and scope of the present invention as defined by the appended claims.

What is claimed is:

1. An apparatus for transferring objects from a first region having a first atmosphere to a second region having a second atmosphere for use with a motor, said apparatus comprising:
   a shell positioned between said first region and said second region, said shell having an inner surface, an entrance in communication with said first region, and an exit opposing said entrance, said exit in communication with said second region;
   a vane assembly having an axis and a plurality of vanes disposed about said axis, said vanes extending radially and axially through said shell so that said vanes sealingly engage said inner surface of said shell as said vanes revolve about said axis, any two adjacent vanes of said plurality of vanes defining a moving chamber therebetween, said moving chamber having a third atmosphere, said moving chamber dimensioned to receive at least one object of said objects; and
   means operated by said motor for moving said at least one object from said first region to said second region from said entrance to said exit, said moving means engaging said plurality of vanes.

2. The apparatus as recited in claim 1, wherein said moving means further comprises a conveyor belt.

3. The apparatus as recited in claim 1, wherein said moving means further comprises a conveyor belt having means formed on said conveyor belt for engaging each vane of said plurality of vanes and, by so engaging, rotating said vane assembly.

4. The apparatus as recited in claim 1, wherein said moving means further comprises a conveyor belt having a concave arcuate portion, said arcuate portion of said conveyor belt engaging more than one vane of said plurality of vanes as said vane assembly rotates about said axis so that said movable chamber is temporarily sealed from said first and said second regions by engagement of said more than one vane against said conveyor belt.

5. The apparatus as recited in claim 1, wherein said apparatus further comprises means connected to said shell in fluid communication with said moving chambers for adjusting said third atmosphere.

6. An apparatus for transferring objects from a first region having a first atmosphere to a second region having a second atmosphere, said apparatus comprising:
   a shell, positioned between said first region and said second region, having an inner surface, an entrance and an exit opposing said entrance, said entrance communicating with said first region and said exit communicating with said second region;
   a motor driven conveyor belt movable through said shell from said entrance to said exit, said conveyor belt having a surface;
   a vane assembly having an axis and a plurality of vanes disposed about said axis, said vanes extending along said axis and radially from said axis to said shell,
   said plurality of vanes sealingly engaging said inner surface of said shell as said plurality of vanes revolve about said axis,
   said plurality of vanes sealingly engaging said surface of said conveyor belt as said vane assembly rotates about said axis and said conveyor belt moves, adjacent vanes of said plurality of vanes cooperating with said surface of said conveyor belt and said inner surface of said shell to temporarily form a moving chamber, said moving chamber dimensioned to hold at least one object of said objects, said moving chamber having a third atmosphere.

7. The apparatus as recited in claim 6, wherein said plurality of vanes further comprises at least four vanes.

8. The apparatus as recited in claim 6, wherein each vane of said plurality of vanes has an edge, further comprising a gasket carried by said edge.

9. The apparatus as recited in claim 6, wherein said conveyor belt has a plurality of ribs carried by said surface, each rib of said plurality of ribs engaging a vane of said plurality of vanes.

10. The apparatus as recited in claim 6, wherein said conveyor belt has a plurality of ribs carded by said surface, each rib of said plurality of ribs engaging a vane of said plurality of vanes and, as said conveyor belt moves, pushing said vanes.

11. The apparatus as recited in claim 6, wherein said conveyor belt has a plurality of grooves formed in said surface, each vane of said plurality of vanes engaging a groove of said plurality of grooves.

12. The apparatus as recited in claim 6, wherein said conveyor belt has a plurality of grooves formed in said surface, each vane of said plurality of vanes engaging a groove of said plurality of grooves so that said conveyor belt can push said each vane, thereby rotating said vane assembly.

13. The apparatus as recited in claim 6, wherein said vane assembly further comprises a pair of disks attached to said vane assembly and rotating therewith.

14. The apparatus as recited in claim 6, further comprising means attached to said shell and in fluid communication with said third atmosphere of said moving chamber for adjusting said third atmosphere.

15. An apparatus for transferring objects from a first region having a first atmosphere to a second region having a second atmosphere, said apparatus for use in an opening in a wall separating said first and second regions, said apparatus comprising:
   a shell positioned in said opening having an inner surface, an entrance and an exit, said entrance communicating with said first region and said exit communicating with said second region;
   a vane assembly in said shell and having an axis and at least four vanes disposed about said axis, said at least four vanes extending across said shell and dimensioned to sealingly engage said inner surface of said shell as said at least four vanes revolve about said axis in said shell;
   a motor driven endless conveyor movable through said shell from said entrance to said exit, said conveyor having an upper surface and an arcuate portion where said conveyor passes in sealing engagement with at least one of said at least four vanes, adjacent vanes of said at least four vanes of vanes cooperating with said arcuate portion and said inner surface to temporarily form a moving chamber, said chamber dimensioned to hold at least one object and having a third atmosphere; and means in communication with said third atmosphere for recovering a constituent of said third atmosphere.

16. The apparatus as recited in claim 15, wherein said endless conveyor has a concave arcuate portion, said arcuate portion of said endless conveyor engaging more than one vane of said at least four vanes as said vane assembly rotates about said axis so that said movable chamber is temporarily sealed from said first and said second regions by engagement of said more than one vanes against said endless conveyor.

17. The apparatus as recited in claim 15, wherein said endless conveyor has a plurality of ribs carried by said surface, each rib of said plurality of ribs engaging a vane of said plurality of vanes.

18. The apparatus as recited in claim 15, wherein said endless conveyor has a plurality of ribs carried by said surface, each rib of said plurality of ribs engaging a vane of said plurality of vanes and, as said endless conveyor moves, pushing said vanes.

19. The apparatus as recited in claim 15, wherein said endless conveyor has a plurality of grooves formed in said surface, each vane of said plurality of vanes engaging a groove of said plurality of grooves.

20. The apparatus as recited in claim 15, wherein said recovering means further comprises:

conduits attached to said shell and in fluid communication with said third atmosphere; and means for replacing said third atmosphere as said vane assembly rotates after said moving chamber is sealed by said endless conveyor from communication with said first region and before said moving chamber is in communication with said second region.

* * * * *